Aug. 12, 1969

JAMES E. WEBB
ADMINISTRATOR OF THE NATIONAL AERONAUTICS
AND SPACE ADMINISTRATION
CONICALLY SHAPED CAVITY RADIOMETER WITH A
DUAL PURPOSE CONE WINDING 3,461,290

Filed Oct. 3, 1966

INVENTORS
JAMES M. KENDALL, SR.
JOSEPH A. PLAMONDON
BY

ATTORNEYS

INVENTORS
JAMES M. KENDALL, SR.
JOSEPH A. PLAMONDON
ATTORNEYS

United States Patent Office 3,461,290
Patented Aug. 12, 1969

3,461,290
CONICALLY SHAPED CAVITY RADIOMETER
WITH A DUAL PURPOSE CONE WINDING
James E. Webb, Administrator of the National Aeronautics and Space Administration, with respect to an invention of James M. Kendall, Sr., and Joseph A. Plamondon, Jr., both of Pasadena, Calif.
Filed Oct. 3, 1966, Ser. No. 584,015
Int. Cl. G01t 1/16; H01j 39/00
U.S. Cl. 250—83.3                                10 Claims

ABSTRACT OF THE DISCLOSURE

A black body radiation receptor in the form of a conically shaped cavity with cone winding, which is in thermal contact with the cone, serving both as a temperature sensor and cavity heating element. The receptor is surrounded by a thermal guard, having a guard temperature sensing element, which together with the cone winding is connected in a D.C. bridge configuration to provide a control signal used to control the supply of power to the cone winding to maintain the cavity in temperature equilibrium with the thermal guard. The power supplied to the cone winding to maintain temperature equilibrium is a function of the radiation into the receptor, the equilibrium temperature and the cone's area.

---

Figure 1:
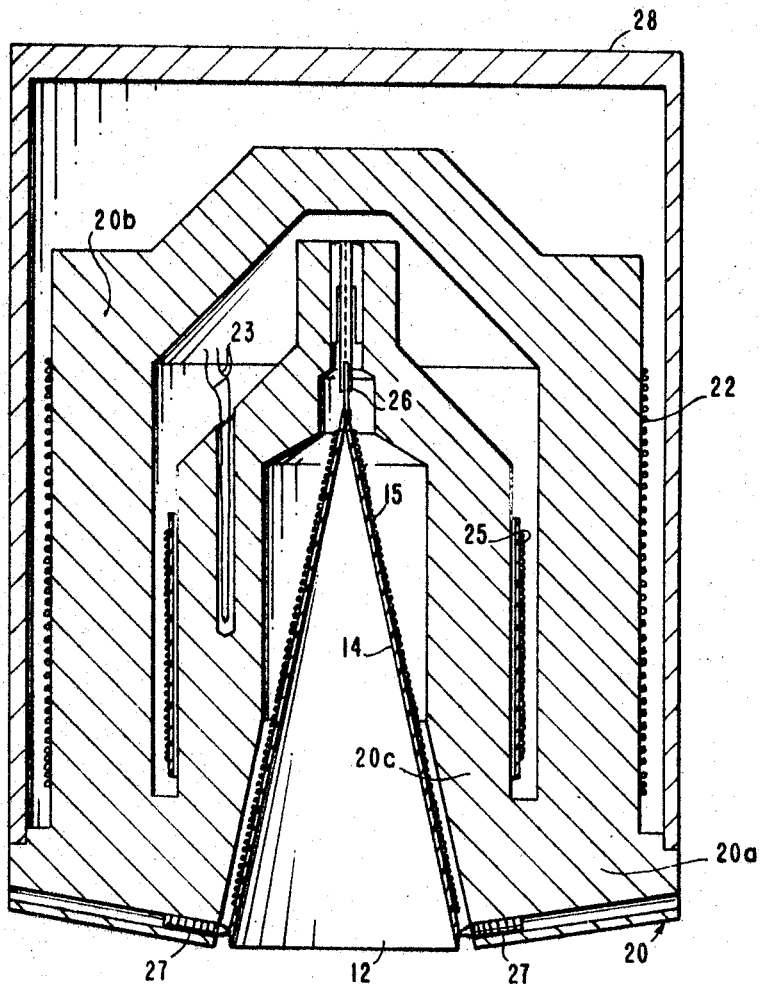

The invention described herein was made in the performance of work under a NASA contract and is subject to the provisions of Section 305 of the National Aeronautics and Space Act of 1958, Public Law 85–568 (72 Stat. 435; 42 USC 2457).

This invention generally relates to radiation measurement and, more particularly, to an improved radiometer of the cavity type, capable of providing a measure of radiation without resort to a radiation standard.

Radiation measurements are extensively performed in commercial, as well as, military applications. These measurements are generaly performed by devices, known as radiometers, designed to measure to a high degree of accuracy, either absolute or relative radiation intensity. The measurement capabilities of some radiometers are limited to narrow ranges of energy, such as either the ultraviolet, visible or infrared, while others act as secondary radiometers in that the measurements provided thereby can only be interpreted in conjunction with readings of a primary radiation standard. These limiting characteristics are highly disadvantageous when measurements are to be performed over a wide energy range and/or when a primary radiation standard is either not available or cannot be included because of weight, size and cost limitations. Such limitations are present in the design of equipment for space exploration where reduced size and weight are major design goals.

It is a primary object of the present invention to provide a new improved radiometer.

Another object is to provide an absolute radiometer which does not require a reference radiation standard.

A further object is the provision of a highly accurate absolute radiometer which provides uniform response to radiation intensity over a wide energy range.

Still a further object is to provide a radiometer, constructable to meet present-day design goals of space exploration equipment.

Yet a further object is the provision of a small highly accurate radiometer capable of measuring the absolute value of radiation intensity over a wide energy range.

These and other objects of the invention are achieved by providing a radiometer which in essence consists of a black body conical cavity, made out of a material of high heat conductivity, with a wire of a high temperature coefficient of resistance, wound abount the exterior of the cavity or cone and in thermal contact therewith. The wire about the cone will hereafter be referred to as the cone winding. The exterior of the cone is surrounded by a thermal guard which supports the cone by means of a glass fibre and glass-tipped screws, to minimize heat conduction therebetween. A guard temperature sensing winding is located within the thermal guard to provide an accurate indication of the guard's temperature. The guard is maintained at a constant selected temperature, which is high enough so that radiation out of the cone is greater than any expected radiation into the cone. The guard temperature sensing winding and the cone winding are used to form two legs of a direct current (D.C.) bridge with the difference between the voltages across the two windings being used to control an external alternating current (A.C.) heating source which directly heats the cone winding to maintain the cone at the same temperature as that of the guard, hereafter referred to as temperature equality. The heating source is connected to the cone winding to form an A.C. bridge therewith.

In the absence of radiation into the cone, the amount of A.C. energy or power necessary to maintain the temperature of the cone to equal that of the guard, equals the radiation out of the cone which is a function of the known temperature and cone area. Any reduction in the amount of A.C. power necessary to maintain temperature equality is directly equal to radiation into the cone. Thus by monitoring the cone's temperature, the A.C. power supplied to the winding thereof and knowing the cone's area, the radiation into the cone is directly obtainable.

Figure 2:
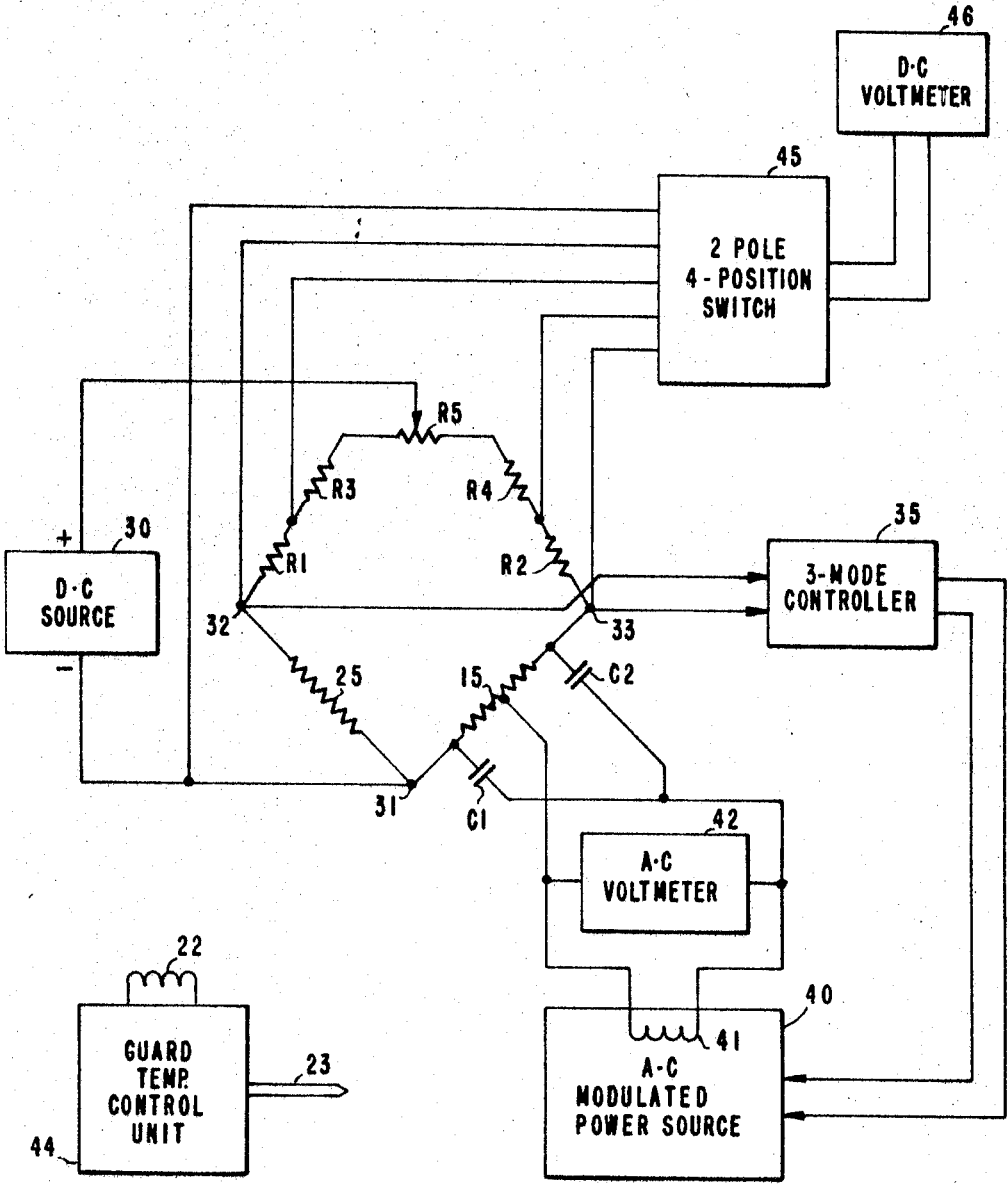

The novel features that are considered characteristic of this invention are set forth with particularity in the appended claims. The invention will best be understood from the following description when read in connection with the accompanying drawings, in which:

FIGURE 1 is a cross-sectional view of the radiometer of the present invention; and FIGURE 2 is a block and schematic diagram of the circuitry of the radiometer.

Reference is now made to FIGURE 1 which is a simplified cross-sectional view of the radiometer of the present invention. Therein, the radiometer is shown to include a conical cavity, hereinafter also referred to as a cone 12, which serves as a radiation receptor. Since energy is assumed to be received only by radiation, the radiometer is assumed to be in a vacuum or enclosed in a vacuum environment. The cone is formed of a material 14 of a high conductivity, made of an optimum thickness in order to reduce thermal gradients in the cone to a minimal value, as well as, in order to provide rapid reestablishment of temperature equality as will be explained hereafter. The internal surface of the cone is coated with black matter so that it can serve as an efficient black body radiation receptor. Parson's black lacquer or gold or platinum black are examples of some of the materials which may be used for coating purposes. In one embodiment, the use of thin silver foil of a thickness of 0.005 inch has been found to be of near optimum thickness, with the foil being rolled to the conical shape and the edges, silver soldered together. The internal surface was coated with black matter with the cone estimated to act as a black body to better than 99.5% for all wavelengths between $0.2\mu$ and $40\mu$.

A wire of high thermal coefficient of electrical resistance is wound about the exterior of the cone and in thermal contact therewith to form a cone winding 15. The cone winding, which in one embodiment consisted of enameled platinum wire 1.5 mils diameter with a thermal coefficient of electrical resistance of about 0.004° C. provides a highly sensitive resistance thermometer of the cone. In addition, the cone winding 15 serves as an electrical heating element for the cone, to maintain it at a temperature equal to that of a thermal guard 20 which surrounds and supports the cone.

A heating coil 22 is shown wound about the guard 20, with a thermocouple 23, or any other temperature sensing device embedded therein. Briefly, the function of thermocouple 23 is to monitor the guard's temperature and supply signals to a guard heating unit (not shown) which supplies energy to heating coil 22 to maintain the guard at a constant predetermined temperature. The use of a temperature measuring device to control the supply of energy to maintain a device at a constant temperature is well known in the art.

In addition to the heating coil 22 and thermocouple 23, a guard temperature sensing winding 25 is wound in the guard and in thermal contact therewith to sense to a high degree of accuracy the temperature thereof. Thus, whereas cone winding 15 serves as a sensitive resistance thermometer of the cone, winding 25 serves as a sensitive resistance thermometer of the guard 20.

For the accurate performance of the radiometer of the present invention, it is important to minimize heat conduction between cone 12; that is, cone material 14 and the cone winding 15 and the thermal guard 20. This is accomplished by supporting the cone in the guard by means of a glass tube or fibre 26 and glass-tipped centering screws 27. Glass was chosen for supporting purposes because of its low thermal conductivity and other mechanical properties, including its strength to support the cone. However, it should be appreciated that any other material of low thermal conductivity and similar properties may be employed for such purposes.

In one embodiment actually reduced to practice, the guard 20 is made of copper, designed to have a large cross-sectional area at the aperture end of the guard 20a to enable heat to flow from the heating coil 22 through the outer part 20b of the guard to the inner part 20c, surrounding cone 12, and thereby insure isothormality of the guard. Under equilibrum conditions, no heat can flow out of the inner portion of the guard to the outer portion thereof, since the inner portion is surrounded by the outer portion, with both being at the same temperature. Hence, no temperature gradients occur in the inner part. To minimize thermal coupling between the guard 20 and cone 12, the inner surface of the guard surrounding the cone is preferably gold plated and highly polished.

Generally, the guard temperature sensing winding 25 is constructed of the same materials as cone winding 15, and measured to have nearly the same resistance at a given temperature. Thus, by comparing the resistances of the two windings, any temperature difference which occurs between the cone and the guard can be easily and accurately sensed. The guard 20 and in particular the heating coil 22 wound thereon, may be protected by an external cover 28.

Briefly, in addition to the arrangement as described in FIGURE 1, the radiometer of the present invention includes a source of alternating current (A.C.) power which is connected to cone winding 15 in an A.C. bridge, providing it with sufficient A.C. power to heat cone winding 15 and thereby cone 12, to maintain it in temperature equality with the temperature of guard 20, as sensed by guard temperature sensing winding 25. In the absence of radiation into cone 12, the amount of A.C. power necessary to be supplied to cone winding 15, to maintain the cone in temperature equality with guard 20, is equal to the radiation out of the cone, which is a function of the area thereof, as well as the particular cone temperature at which it is maintained. Any variations in the amount of A.C. power from such level which is necessary to maintain the cone winding 15 in temperature equality with guard 20 is related to the radiation into the cone, and thereby provides a measure of such input radiation.

The relationship between the radiation out of the cone, radiation into the cone, and the amount of A.C. power necessary to maintain the cone in temperature equality with the guard 20, may best be expressed by the following equation:

$$A\sigma T_R^4 = IA + W \qquad (1)$$

where A represents the cone's area, $\sigma$ is the Stephen Boltzman constant, $T_R$ represents the cone's temperature, which is assumed to be in temperature equilibrium with the guard's temperature, while W represents the electrical (A.C.) power supplied to the cone winding to maintain it in temperature equality with the guard. The term I represents the unknown radiation into the cone. With the cone area A known, by measuring the cone's temperature and the amount of power (W) necessary to maintain the cone in temperature equality with the guard, the unknown radiation into the cone, i.e. the term I, is determinable. The A.C. power W may be determined as a function of the A.C. current supplied to winding 15 and the resistance thereof.

Attention is now directed to FIGURE 2 which is a combination block and schematic diagram of the circuitry of the radiometer of the present invention. Therein, cone winding 15 and guard temperature sensing winding 25 are shown connected together with resistors R1 through R4 and a variable resistor R5 in the form of a bridge across a direct current (D.C.) source, generally designated by numeral 30. Windings 15 and 25 are connected together at a junction terminal 31 which is assumed to represent the negative potential of source 30, while the movable arm of resistor R5 is connected to the positive terminal of the source. Resistors R1 and R2 are precision resistors of equal resistance which are related to the resistances of the windings 15 and 25. In one actual embodiment with the resistance of each of windings 15 and 25 varying between 600 to 1300 ohms, the resistance of each of resistors R1 and R2 was 1000 ohms. R3 and R4 were 20K ohm resistors while R5 was a 500 ohm 10-turn potentiometer. Source 30 was a 6 volt D.C. power supply.

In FIGURE 2, R1 is shown connected between a junction point 32 to which one end of guard temperature sensing winding 25 is connected and one end of R3, the other end of which is connected to one end of R5. The other precision resistor R2 is connected to a junction point 33, to which one end of cone winding 15 is connected and to one end of R4, the other end of which is connected to R5. Variable resistor R5 is utilized for bridge adjustment. When the voltage drop across each of the windings 15 and 25 is the same, and therefore junction points 32 and 33 are at the same potential level, i.e. the voltage difference thereacross is zero.

As seen from FIGURE 2, junction points 32 and 33 are connected to a 3-mode controller 35, the output terminals of which are connected to an A.C. modulated power source 40, shown having an output winding 41, one terminal of which is connected to the center point of cone winding 15. The other end of output winding 41 of modulated power source 40 is connected to the ends of cone winding 15 through capacitors C1 and C2. An A.C. voltmeter 42 is connected across winding 41. Winding 41 together with cone winding 15 and capacitors C1 and C2 may be thought of as forming an A.C. bridge, while winding 15 together with winding 25 and resistors R1 through R5 form a D.C. bridge. The function of the capacitors is to block D.C. current from source 30 from affecting the A.C. circuits. The D.C. current from source 30, used to balance the D.C. bridge is low enough, that its heating effect on windings 15 and 25 can be neglected.

Basically, power source 40 is controlled or modulated by controller 35 to supply cone winding 15 with current, which heats the cone winding 15 so that the cone is in temperature equality with the guard. This is sensed by the absence of any potential difference between terminals 32 and 33 supplied to controller 35. Any potential difference across terminals 32 and 33 is utilized by controller 35 to modify the operation of source 40 and adjust the current supplied thereby to winding 15 to produce temperature equality between the cone and the guard. In one embodiment actually reduced to practice, the controller 35 was a precision deviation controller, sold by Robert Shaw Controls Company of Anaheim, Calif. A 1200 c.p.s. oscillator was used as source 40, with the signals from controller 35 used to control the power supplied to winding 15 to maintain the cone and the guard in temperature equality.

From the foregoing, it should be appreciated that cone winding 15 serves a double function. One of its functions is to serve as a sensitive resistance thermometer to measure the temperature of the cone, while the other function is to serve as a heating winding to control the cone's temperature to be in equality with that of the guard. Also, from Equation 1, it is appreciated that in the absence of radiation into the cone, i.e. the term IA, is zero, the total power which source 40 has to supply to cone winding 15 equals the total radiation out of the cone, expressed by the lefthand term $A\sigma T_R^4$. However, when the radiation into the cone is not zero, the power necessary to be supplied by source 40 to cone winding 15 is reduced by an amount or value directly related to the input radiation. Thus, by determining the A.C. power supplied by source 40, the radiation into the cone can be directly determined. The total power supplied by source 40 may be determined as a function of the A.C. voltage, E measured by voltmeter 42 and the actual resistance of cone winding 15, while the actual temperature $T_R$ at which the cone and guard are maintained may be determined by measuring the actual resistance of guard temperature sensing winding 25 during such measurements. The total power W may be expressed as $E^2/R/^4$, where E is the A.C. voltage measured by voltmeter 42 and R is the total resistance of winding 15.

It should be pointed out that in addition to the circuitry shown in FIGURE 2, the radiometer of the present invention includes a source of energy which responds to the guard's temperature as detected by thermocouple 23 to supply sufficient energy or power to the guard by means of heating coil 22 to maintain the guard at the desired constant temperature. Such heating arrangements are well known in the art and therefore detailed description thereof is deemed unnecessary. However, for explanatory purposes, such source is diagrammed in FIGURE 2 by block 44, designated guard temperature control unit, shown connected to thermocouple 23, and heating coil 22.

To accurately measure the guard temperature $T_R$, as well as the resistance of cone winding 15 which, together with the voltage 42 from source 40, is used to determine the energy supplied by the source, the present invention may include a two-pole four-position switch 45, shown connected to terminals 31, 32, 33 and the junction points of precision resistors R1 and R2 with resistors R3 and R4, respectively. The output of the switch is shown connected to a D.C. voltmeter 46. The function of the switch 45 and meter 46 is to sequentially accurately monitor and measure the voltages across the two precision resistors R1 and R2 and the windings 15 and 25. From the voltage drop across the precision resistor R1, and the voltage drop across winding 25, the actual resistance of winding 25 may be accurately determined and therefrom the temperature $T_R$. Similarly, by comparing the voltage drop across the precision resistor R2 and the voltage drop across winding 15, the exact resistance (R) of winding 15 is determined. Thus the voltages recorded by D.C. voltmeter 46 and the A.C. voltmeter 42 may be used to determine the power supplied by source 40, at any given time, and therefrom determine the radiation into the cone 12. Voltmeters 42 and 46 may be connected to a computing apparatus to automatically compute, in accordance with Equation 1, and record the radiation into the cone 12, which represents the radiation received by the radiometer of the present invention.

From the foregoing description, it should be appreciated that the essential features of the radiometer of the present invention include a thermal guard, maintained at a preset constant temperature by means of a separate heating source, and a conical cavity acting as a black body radiation receptor, including a cone winding. The cone winding is used to sense the cone's temperature as well as be supplied with A.C. power, which heats the winding so as to maintain the cone at temperature equality with the guard. The amount of power necessary to be supplied to the cone winding to maintain it in temperature equality with the thermal guard is used to determine the radiation into the cone. For the radiometer's measurements to be accurate, the thermal guard must be maintained at a constant temperature, which has to be accurately measured. Also, the A.C. power source 40 has to supply exactly enough electrical power or heat to the cone winding to maintain the cone in temperature equality with the guard. Lastly, the power necessary to maintain such temperature equality need be accurately measured.

The use of the novel arrangement constituting an absolute device eliminates the need of a radiation standard. Also, the use of a black conical cavity as the radiation receptor enables the detection of radiation of a wide energy range. Furthermore, by positioning the cone 12 in the guard 20 so that the entire base of the cone is exposed to radiation, tests performed on the directional sensitivity of the radiometer of the invention indicate that the directional sensitivity of the radiometer follows the cosine law within about 1%.

Furthermore, in the absence of the circuitry heretofore disclosed, whereby the cone is maintained in temperature equality with the thermal guard by means of the power source 40, providing heating energy to the cone winding 15, a relatively long period would elapse before the cone reaches temperature equilibrium within 1%. However, by incorporating the source 40 which supplies A.C. power to the cone winding 15, with the power being regulated by controller 35 to produce temperature equality, the time, required to reach 1% of temperature equilibrium, which represents the radiometer's effective response time, is greatly reduced, to the neighborhood of 1 second or less.

There has accordingly been shown and described herein a novel absolute radiometer. It is appreciated that those familiar with the art may make modifications in the arrangements as shown without departing from the true spirit of the invention. Therefore, all such modifications and/or equivalents are deemed to fall within the scope of the invention as claimed in the appended claims.

What is claimed is:
1. A radiation measuring system comprising:
conical cavity means defining a radiation receptor;
thermal guard means maintainable at a preselected constant temperature, said thermal guard means surrounding said conical cavity means and substantially thermally decoupled therefrom;

first means coupled to said thermal guard means and said conical cavity means for providing control signals as a function of the temperature thereof;

second means coupled to said conical cavity means and responsive to said control signals for supplying said conical cavity means with heating energy to maintain it in temperature equality with said thermal guard means; and means for measuring the heating energy supplied by said second means to said conical cavity means to maintain it in temperature equality with said thermal guard means to provide an indication of the radiation into said radiation receptor.

2. A radiation measuring system comprising:

conical cavity means defining a radiation receptor;

thermal guard means maintainable at a preselected constant temperature, said thermal guard means surrounding said conical cavity means and substantially thermally decoupled therefrom;

first means coupled to said thermal guard means and said conical cavity means for providing control signals as a function of the temperatures thereof;

second means coupled to said conical cavity means and responsive to said control signals for supplying said conical cavity means with heating energy to maintain it in temperature equality with said thermal guard means;

means for measuring the heating energy supplied by said second means, said conical cavity means comprises a conically shaped member having high heat conductivity and a cone winding wound about the exterior of said member in thermal contact therewith, said cone winding having a high thermal coefficient of resistance, and said thermal guard means includes:

a heat conducting member of a metal having high heat conductivity, defining a thermal guard;

means for maintaining said thermal guard at said preselected temperature and a guard temperature sensing winding having a high thermal coefficient of resistance in thermal contact with said guard, and said first means includes resistive means connected with said cone winding and said guard temperature sensing winding to form a first bridge circuit;

a source of direct current potential connected across said first bridge circuit; and control means for sensing the direct current potential drops across said cone winding and said guard temperature sensing winding to produce said control signals as a function thereof.

3. The system as recited in claim 2 wherein said second means includes a source of alternating current potential having an output winding, means coupling said output winding and said cone winding in a second bridge circuit and means for controlling said source of alternating current with said control signals to control the supply of alternating current energy from said output winding to said cone winding so as to maintain said conical cavity means and thermal guard means in temperature equality.

4. The system as recited in claim 3 wherein one end of said output winding is connected to the center of said cone winding and the other end of said output winding is connected to each end of the cone winding through a direct current blocking capacitor to form said second bridge circuit.

5. The system as recited in claim 4 further including means for measuring the alternating current voltage across said output winding and means for determining the resistance of said cone winding to determine the alternating current energy supplied to said cone winding.

6. A radiation measuring system comprising:

a conical cavity formed of metallic cone which has high heat conductivity with the base of said metallic cone being directed outwardly to define a radiation receiving aperture;

a cone winding, having a high coefficient of resistance wound about the exterior of said metallic cone in thermal contact therewith, whereby the resistance of said cone winding is related to the temperature of said metallic cone;

a thermal guard positioned about the exterior of said metallic cone and the cone winding thereof;

support means having low heat conductivity supporting said metallic cone in said thermal guard;

means adapted to maintain said thermal guard at a preselected temperature;

a guard temperature sensing winding wound within said thermal guard and in thermal contact therewith, said guard temperature sensing winding having a high coefficient of resistance with the resistance thereof being related to the temperature of said guard;

first means including a source of direct current potential and means for connecting said cone winding and guard temperature sensing winding in a first bridge circuit across said source of direct current potential;

potential difference sensing means connected to said cone winding and said guard temperature sensing winding in said first bridge circuit for providing a control signal as a function of the direct current potential differences therebetween;

second means, including an output winding and a pair of direct current blocking means, connected with said cone winding in a second bridge circuit, and a controllable alternating current source responsive to said control signal for providing alternating current energy to said cone winding through said output winding to maintain said metallic cone forming said conical cavity at a temperature equal to the preselected temperature of said thermal guard; and measuring means adapted to provide a measure of the alternating current energy provided to said cone winding to determine the radiation received by said conical cavity.

7. The system as recited in claim 6 wherein said first means includes first and second precision resistors;

third and fourth resistors;

means connecting said guard temperature sensing winding and said first and third resistors in series;

means connecting said cone winding and said second and fourth resistors in series;

means connecting one terminal of each of said cone windings and the guard temperature sensing winding to one terminal of said source of direct current potential;

a variable resistor connected to one terminal of each of said third and fourth resistors, the movable arm of said variable resistor, being connected to the other terminal of said source of direct current potential, said cone winding, guard temperature sensing winding, first, second, third, fourth, and variable resistors defining said first bridge circuit, the position of the movable arm of said variable resistor being adjustable to balance said first bridge circuit.

8. The radiation measuring system defined in claim 7 including means connecting one terminal of said output winding to the center of said cone winding and the other terminal of said output winding to each end of said cone winding through a different capacitor comprising said pair of direct current blocking means to form said second bridge.

9. The radiation measuring system defined in claim 8 wherein said measuring means includes a first voltmeter connected across said output winding to measure the alternating current voltage across said output winding, and a direct current voltmeter for measuring the direct current voltage drops across said guard temperature sensing winding and said first resistor and the voltage drops across said cone winding and said second resistor.

10. The radiation measuring system defined in claim 9 wherein said support means whereby said metallic cone is supported in said thermal guard are a plurality of glass-tipped screws about the base of said cone and a glass member supporting the apex of said cone.

References Cited

UNITED STATES PATENTS

| 3,039,006 | 6/1962 | Weiss. | |
|---|---|---|---|
| 3,073,163 | 1/1963 | English et al. | 73—355 |
| 3,091,693 | 5/1963 | Rudomanski et al. | |
| 3,387,134 | 6/1968 | Treharne. | |

ARCHIE R. BORCHELT, Primary Examiner

SAUL ELBAUM, Assistant Examiner

U.S. Cl. X.R.

73—355; 250—83